(12) United States Patent
Rzadki et al.

(10) Patent No.: US 8,545,278 B2
(45) Date of Patent: Oct. 1, 2013

(54) METHOD AND APPARATUS FOR OPERATION OF A MARINE VESSEL HYBRID PROPULSION SYSTEM

(75) Inventors: Wolfgang Rzadki, Glinde (DE); Hannes Schulze Horn, Gladbeck (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 12/451,763

(22) PCT Filed: May 29, 2008

(86) PCT No.: PCT/EP2008/056585
§ 371 (c)(1),
(2), (4) Date: Nov. 30, 2009

(87) PCT Pub. No.: WO2008/145684
PCT Pub. Date: Dec. 4, 2008

(65) Prior Publication Data
US 2010/0167601 A1 Jul. 1, 2010

(30) Foreign Application Priority Data

Jun. 1, 2007 (DE) .......................... 10 2007 025 863

(51) Int. Cl.
*B63H 21/20* (2006.01)
*B63H 23/00* (2006.01)

(52) U.S. Cl.
USPC .................................................. 440/1; 440/3

(58) Field of Classification Search
USPC .............. 440/1, 2, 3, 4, 6, 49, 50, 84, 86, 87; 701/21, 123, 99, 69; 180/65.265, 65.275, 180/65.286
See application file for complete search history.

(56) References Cited

U.S. PATENT DOCUMENTS 2,184,764 A * 12/1939 Buff .................................. 440/3
5,616,056 A   4/1997 Meissner et al.
(Continued)

FOREIGN PATENT DOCUMENTS

DE   3505815 A1   8/1986
DE   4340747 C1   4/1995
(Continued)

OTHER PUBLICATIONS

Machine Translation of JP405246386a—(JPO Translation of HO5-246386.pdf).*

(Continued)

*Primary Examiner* — Daniel Venne
*Assistant Examiner* — Anthony Wiest
(74) *Attorney, Agent, or Firm* — Harness, Dickey & Pierce, P.L.C.

(57) ABSTRACT

A method for operation of a hybrid propulsion system for a marine vessel, including at least one electric motor and at least one internal combustion engine as drive units, is disclosed. Depending on the requirement, for example the vessel speed, the drive units individually or jointly drive at least one propulsion unit, for example a propeller, the power outputs of the drive units to the at least one propulsion unit controlled by a control device as a function of a set value, for example a set value for the propeller rotation speed or the vessel speed, and an operating mode such that the sum of these power outputs results in a total power being output to the at least one propulsion unit, with this total power output being split between the power outputs of the individual drive units as a function of the set value and the operating mode.

30 Claims, 6 Drawing Sheets

(56) References Cited

U.S. PATENT DOCUMENTS

| | | |
|---|---|---|
| 7,241,192 B2 * | 7/2007 | Andersen et al. ................ 440/1 |
| 2005/0106953 A1 | 5/2005 | Andersen et al. |

FOREIGN PATENT DOCUMENTS

| | | |
|---|---|---|
| DE | 4432483 A1 | 3/1996 |
| DE | 10061578 A1 | 6/2002 |
| DE | 10048103 C2 | 9/2002 |
| DE | 101111910 A1 | 9/2002 |
| DE | 10063338 B4 | 3/2007 |
| DE | 102006041031 A1 | 3/2008 |
| EP | 1894835 A2 | 3/2008 |
| JP | 5246386 A | 9/1993 |
| JP | 405246386 A * | 9/1993 |
| JP | 2004255972 A | 9/2004 |
| WO | WO02/047974 A1 | 12/2001 |
| WO | WO 02/072418 | 1/2002 |

OTHER PUBLICATIONS

European Search Report dated Feb. 1, 2012 issued in corresponding European Application No. 08760177.9.

* cited by examiner

METHOD AND APPARATUS FOR OPERATION OF A MARINE VESSEL HYBRID PROPULSION SYSTEM

PRIORITY STATEMENT

This application is the national phase under 35 U.S.C. §371 of PCT International Application No. PCT/EP2008/056585 which has an International filing date of May 29, 2008, which designates the United States of America, and which claims priority on German patent application number DE 10 2007 025 863.3 filed Jun. 1, 2007, the entire contents of each of which are hereby incorporated herein by reference.

FIELD

At least one embodiment of the invention generally relates to a method for operation of a marine vessel hybrid propulsion system and/or a marine vessel hybrid propulsion system. At least one embodiment of the invention also generally relates to an apparatus for carrying out the method.

BACKGROUND

A marine vessel hybrid propulsion system is known, for example, from DE 100 63 338 B4, the entire contents of which are hereby incorporated herein by reference.

WO02/47974 A1 discloses a marine vessel hybrid propulsion system having a variable-pitch propeller as a first propulsion unit, and having a main diesel engine and an electric motor as drive units for the first propulsion unit. The electric motor is switched on all the time and, in conjunction with the variable-pitch propeller, ensures that the main diesel engine is kept at an advantageous operating point. In addition, when the marine vessel is travelling at a given speed without any acceleration, the electric motor and the propeller are regulated such that the total fuel consumption for the main diesel engine and a diesel generator installation for production of electrical power for the electric motor is a minimum. The two drive units are therefore jointly and continuously mechanically coupled to the first propulsion unit, and also drive it jointly.

DE 101 11 910 A1 discloses a propulsion installation for marine vessels having two propellers which are arranged one behind the other and contrarotate as first propulsion units, and having a diesel engine and an electric motor as drive units, wherein the rear propeller is driven by a diesel engine, and the front propeller is driven by an electric motor. Each of the drive units is therefore mechanically coupled, or can be mechanically coupled, to just one first propulsion unit, in order to drive it.

DE 100 63 338 B4 discloses a marine vessel hybrid propulsion system having an electric motor and an internal combustion engine, which is in the form of a gas turbine, as drive units, which individually or jointly drive a propeller of a marine vessel depending on the requirement, for example the marine vessel speed. In this case, the internal combustion engine drives the propeller at high speeds, and the electric motor drives the propeller at low speeds. The two drive units can for this purpose be coupled to the propeller at least at times.

Hybrid propulsion systems such as these or similar hybrid propulsion systems, for example having two electric motors, one gas turbine and two propellers, will be used in the future in particular for navy vessels, such as frigates or corvettes, and on superyachts. Marine vessels such as these should on the one hand flexibly allow operation optimized to a specific operational situation. For example, there may be a requirement for marine vessel operation with emissions which are as low as possible in order to reduce the capability to detect the marine vessel, operation with a maximum acceleration capability in a battle situation, or operation in which the fuel consumption is as low as possible.

On the other hand, these marine vessels should be operated with a crew which is as small as possible. This is generally possible without any problems if the crew is not subject to external influences, such as time pressure. However, in the event of physical and/or psychological stress, for example in the event of a battle, this can lead to errors and therefore to the selection of operating states of the hybrid propulsion system which are not optimum for the currently envisaged purpose.

SUMMARY

At least one embodiment of the present invention is directed to specifying a method by which it is possible to ensure that the hybrid propulsion system can be operated optimally in an existing operational situation, particularly when the marine vessel has only a small crew. A further embodiment of the present invention is directed to specifying an apparatus which is particularly suitable for carrying out the method.

The method according to at least one embodiment of the invention envisages that the respective power outputs of the drive units to the at least one propulsion unit are controlled by a control device as a function of a predeterminable nominal value, for example a nominal value for the propeller rotation speed or the marine vessel speed, and a predeterminable operating mode, such that a total power which is dependent on the nominal value is emitted to the at least one propulsion unit as a result of the sum of these power outputs, wherein this total power output is split between the power outputs of the individual drive units as a function of the nominal value and of the operating mode.

The operating points of the individual drive units can be influenced via the split in the total power between the drive units, thus allowing an optimum operating point to be selected for the hybrid propulsion system for a predetermined operating mode. The operating points of the individual drive units themselves need not in this case necessarily be at an optimum. The essential factor is that the operating point of the overall system, that is to say of the overall hybrid propulsion system, preferably including internal combustion engines for production of electrical power for the at least one electric motor.

For this purpose, during the operation of the hybrid propulsion system, the at least one or each propulsion unit is mechanically firmly coupled or at least can be mechanically firmly coupled to preferably in each case at least two drive units, preferably to in each case at least one electric motor and to at least one internal combustion engine. The at least one or each propulsion unit can then be driven by only a single one of the drive units or, in the case of a joint drive, simultaneously by the at least two drive units. Different operating characteristics of the drive units, in particular such as those between an internal combustion engine and an electric motor, can then be utilized particularly well, in order to set an optimum operating point for the overall system.

The at least one internal combustion engine, and preferably also the at least one electric motor, is preferably mechanically not fixedly coupled to a propulsion unit to be driven but is mechanically coupled to and mechanically decoupled from the propulsion unit to be driven by it as required during operation of the hybrid propulsion system. A drive unit which is not required for driving a propulsion unit at times during the operation of the hybrid propulsion system can then be decoupled from the propulsion unit and need then not also be moved by the drive unit or units which is or are driving the propulsion unit. This is particularly advantageous in the case of the at least one internal combustion engine, with its frequently relatively large mass to be moved.

In this case, the connection or disconnection of drive units to and from the at least one propulsion unit can simultaneously also be controlled via the control of the power split, preferably including mechanical coupling and decoupling of drive units to and from the at least one propulsion unit. The control of the coupling or decoupling of drive units advantageously also includes at least the coupling and decoupling of the at least one internal combustion engine, preferably additionally also the coupling and decoupling of the at least one electric motor.

Since control by the crew requires only the presetting of a small number of control parameters (for example a nominal value for the propeller rotation speed, operating mode), optimized operation of the marine vessel can be ensured even when the crew is only small, and at the same time the crew are also subject to physical and/or psychological stress.

The predeterminable operating mode may in this case be, for example, an operating mode in which the exhaust-gas emissions and/or noise emissions and/or the heat emissions from the hybrid propulsion system, preferably including internal combustion engines, for production of the electrical power for the at least one electric motor, a minimum.

However, the predeterminable operating mode may also be an operating mode in which the total fuel consumption of the hybrid propulsion system, preferably including the internal combustion engines for production of the electrical power for the at least one electric motor, is a minimum.

The total power output and the split in the total power output between the drive units can be controlled particularly easily and exactly on the basis of characteristic data and/or characteristic lines of the assembly of the drive units.

Different characteristic data and/or characteristic lines is or are in each case preferably stored for different operating modes in the control device, wherein the characteristic data and/or characteristic lines which is or are relevant for control of the power split for a predeterminable operating mode is or are selected as a function of the predeterminable operating mode.

In this case, the nominal value can be predetermined by a manually operable speed lever or an autopilot system.

The power output from a drive unit is preferably connected to or disconnected from a propulsion unit without any torque surges.

According to one particularly advantageous refinement of at least one embodiment, each of the drive units can emit a maximum power which is less than the total power required as a maximum for forward propulsion of the marine vessel. At least two drive units therefore need to contribute to achieving the maximum required total power. Since, in normal circumstances, the maximum required total power is required only rarely, the drive units can be designed to be optimized for a lower power level, thus reducing the fuel consumption, the space required and the weight of the drive units.

The electric motor can preferably emit torque continuously variably at a rotation speed range from zero up to the maximum rotation speed of the propulsion unit or units, below the electric motor's limit characteristic line. If required, it is in this case operated in the speed variation by field control range at high rotation speeds up to the maximum rotation speed. The electric motor can therefore be utilized particularly flexibly for setting desired optimum operating points of the hybrid propulsion system, without torque surges, over the entire rotation speed range of the drive units.

The control device advantageously controls the total power output and/or the split in the total power output between the power outputs of the individual drive units, additionally taking account of limit values for their rate of change. Limits such as these, for example acceleration or deceleration limits, make it possible to take account of time constants of the marine vessel propeller with respect to the production of the thrust from the propeller in the water or for the production of the electrical power for the electric motor. Power components such as motors, converters, switches, etc. can therefore be protected against thermal overloading and adverse effects of marine vessel operation can be avoided, for example resulting from unacceptably high fluctuations in the voltage and/or the frequency of the vessel power supply system.

Ripples in actual values, which correspond to the nominal value, for example in actual values recorded by rotation speed sensors for the rotation speed of a propeller shaft, which ripples are caused by torque fluctuations in the drive units, are advantageously suppressed in the control of the power outputs of the drive units. Hence, propulsion torque fluctuations and therefore noise emissions of the marine vessel can be counteracted, which arise when a propeller is subjected to torque fluctuations in the water being travelled in.

The control device preferably additionally controls the split in the total power output as a function of the rate of change of the nominal value. This makes it possible to avoid unnecessary coupling and gearbox switching processes, thus achieving a high acceleration capability.

Particularly good capabilities for optimization of the fuel consumption are achieved if the at least one electric motor ds used as the main drive system for propulsion of the marine vessel for a lower speed range of the marine vessel, and the at least one internal combustion engine is used on its own or in conjunction with the at least one electric motor as the main drive system for a higher speed range of the marine vessel up to the maximum speed.

According to one particularly advantageous refinement of at least one embodiment, in this case, in the lower speed range, the at least one electric motor carries out the rotation speed control of the propulsion unit or units. Further, in the higher speed range, the at least one internal combustion engine carries out the rotation speed control of the propulsion unit or units, wherein, when the at least one electric motor is being operated together with the at least one internal combustion engine. The internal combustion engine carries out the rotation speed control of the propulsion unit or units, and the rotation speed of the electric motor is further controlled by the propulsion unit or by the internal combustion engine and, governed by the nominal value preset, emits a torque to the propulsion unit or units such that the power which is respectively emitted by the internal combustion engine and the electric motor is added in the propulsion unit or units.

The method of at least one embodiment is advantageously used for a hybrid propulsion system which has two and only two electric motors and one and only one gas turbine as drive units, and two and only two propeller shafts each having one propeller as propulsion units, wherein the propeller shafts are passed through a gearbox via which the propeller shafts can be coupled to the gas turbine, and wherein each of the propeller shafts can be coupled to in each case one of the electric motors at the propeller shaft's end remote from the propeller, without an intermediate gearbox.

An apparatus which is particularly suitable for carrying out at least one embodiment of the method has a nominal value transmitter for presetting a nominal value, for example a nominal value for the rotation speed of a propeller or for the marine vessel speed, an operating mode transmitter for presetting an operating mode, and a control device which is designed to control the power output of each of the drive units to the at least one propulsion unit such that a total power which is dependent on the nominal value can be emitted to the at least one propulsion unit as a result of the sum of these power outputs, and in this case this total power output is split between the power outputs of the individual drive units as a function of the nominal value and of the operating mode.

Preferably, during the operation of the hybrid propulsion system, the at least one or each propulsion unit is in this case preferably mechanically fixedly coupled or at least can be mechanically fixedly coupled to in each case at least two drive units, preferably to in each case at least one electric motor and to at least one internal combustion engine.

Advantageously, in at least one embodiment, the at least one internal combustion engine, preferably also the at least one electric motor, can be mechanically coupled to the propulsion unit to be driven and/or can be decoupled therefrom as a function of the requirement during operation of the hybrid propulsion system.

In this case, the control device is advantageously designed to also control the connection or disconnection of the drive units to and from the at least one propulsion unit via the control of the power split, preferably including mechanical coupling or decoupling of drive units, in particular of the at least one internal combustion engine, to and from the at least one propulsion unit.

In this case, the nominal value transmitter may be a manually operable speed lever or an autopilot system.

According to one particularly advantageous refinement of at least one embodiment, the apparatus has drive system controllers, which are associated with the individual drive units, for controlling their respective power output, wherein the control device controls the power output of the drive units by presetting rotation speed nominal values or torque nominal values for the drive system controllers.

In order to protect power components against thermal overloading and against adverse effects of the marine vessel operation, the control device may have limiting means for limiting the rates of change of the total power output and/or the split in the total power output between the individual drive units.

Advantageously, in at least one embodiment, the apparatus for controlling the power outputs of the drive units has sensors for detection of at least one actual value, which corresponds to the at least one nominal value, for example of an actual value for the rotation speed of a propeller shaft, and filter means for suppression of ripples in the actual values caused by torque fluctuations of the drive units.

The advantages mentioned in conjunction with the method according to at least one embodiment of the invention and its advantageous refinements apply in a corresponding manner to the apparatus according to at least one embodiment of the invention and to its advantageous refinements.

BRIEF DESCRIPTION OF THE DRAWINGS

The invention and further advantageous refinements of the invention according to features of the dependent claims will be explained in more detail in the following text with reference to example embodiments in the figures, in which:

DETAILED DESCRIPTION OF THE EXAMPLE EMBODIMENTS

Figure 1:
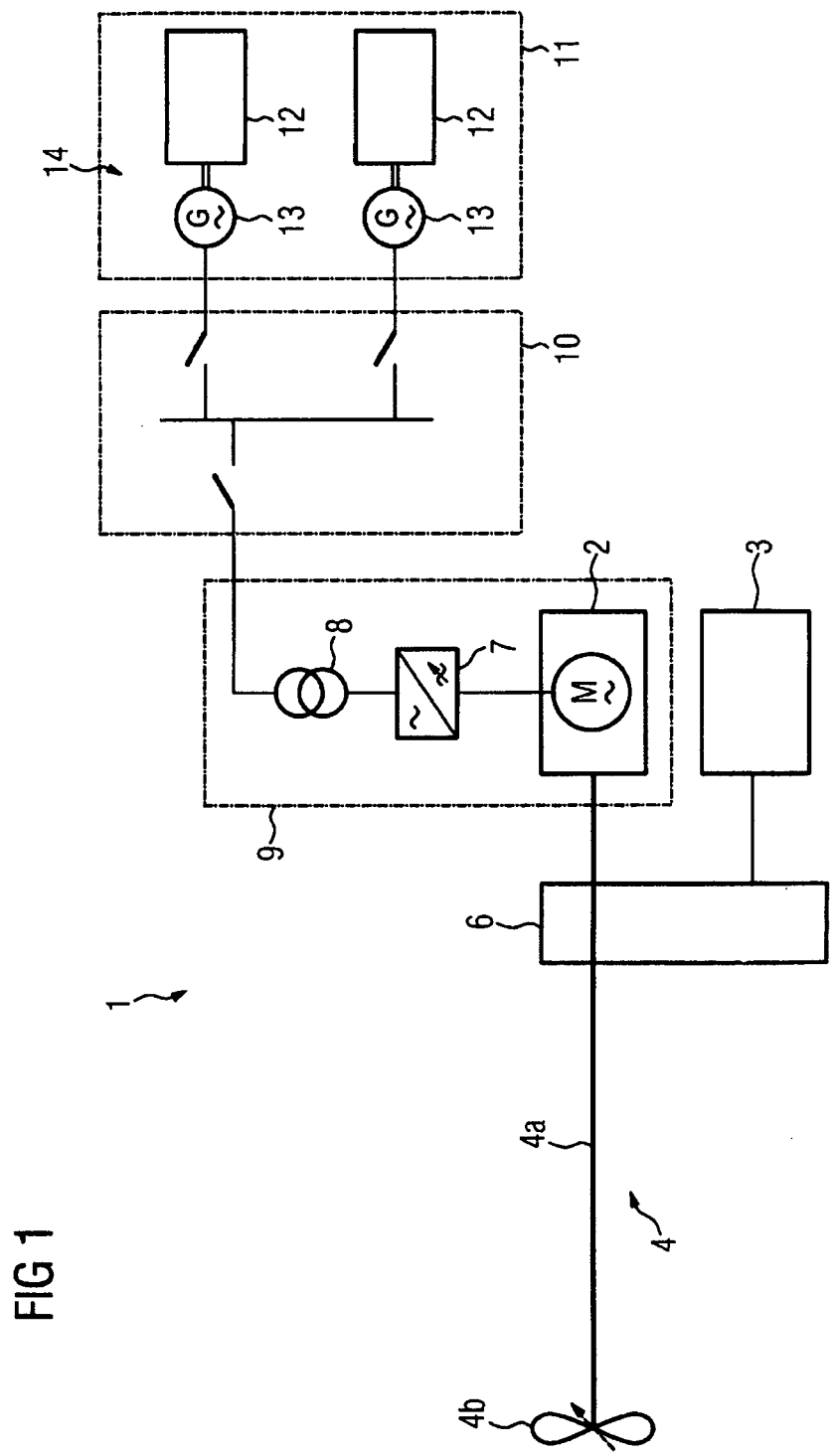
FIG. 1 shows one example of a hybrid propulsion system for a single-shaft marine vessel.

A hybrid propulsion system 1 as shown in FIG. 1 for a single-shaft marine vessel has an electric motor 2 and a gas turbine 3 as drive units, and a propulsion unit 4 comprising a propeller shaft 4a with a fixed-pitch or variable-pitch propeller 4b. The propeller shaft 4a is passed through a gearbox 6 via which the propeller shaft 4a can be coupled to the gas turbine 3. At the end remote from the propeller 4b, the propeller shaft 4a is connected to the electric motor 2, without an intermediate gearbox. The electric motor 2 is supplied with electrical power via a converter 7 (current intermediate-circuit converter or voltage intermediate-circuit converter) and a converter transformer 8 from a power distribution installation 10 (generally a medium-voltage switchgear assembly and sometimes also a low-voltage switchgear assembly). The electric motor 2, the converter 7 and the converter transformer 8 form an electrical drive system 9.

The electrical power is produced by a power production installation 11, in which generally a plurality of internal combustion engines 12, for example diesel engines or gas turbines, each drive a generator 13, in general a polyphase synchronous machine.

Figure 2:
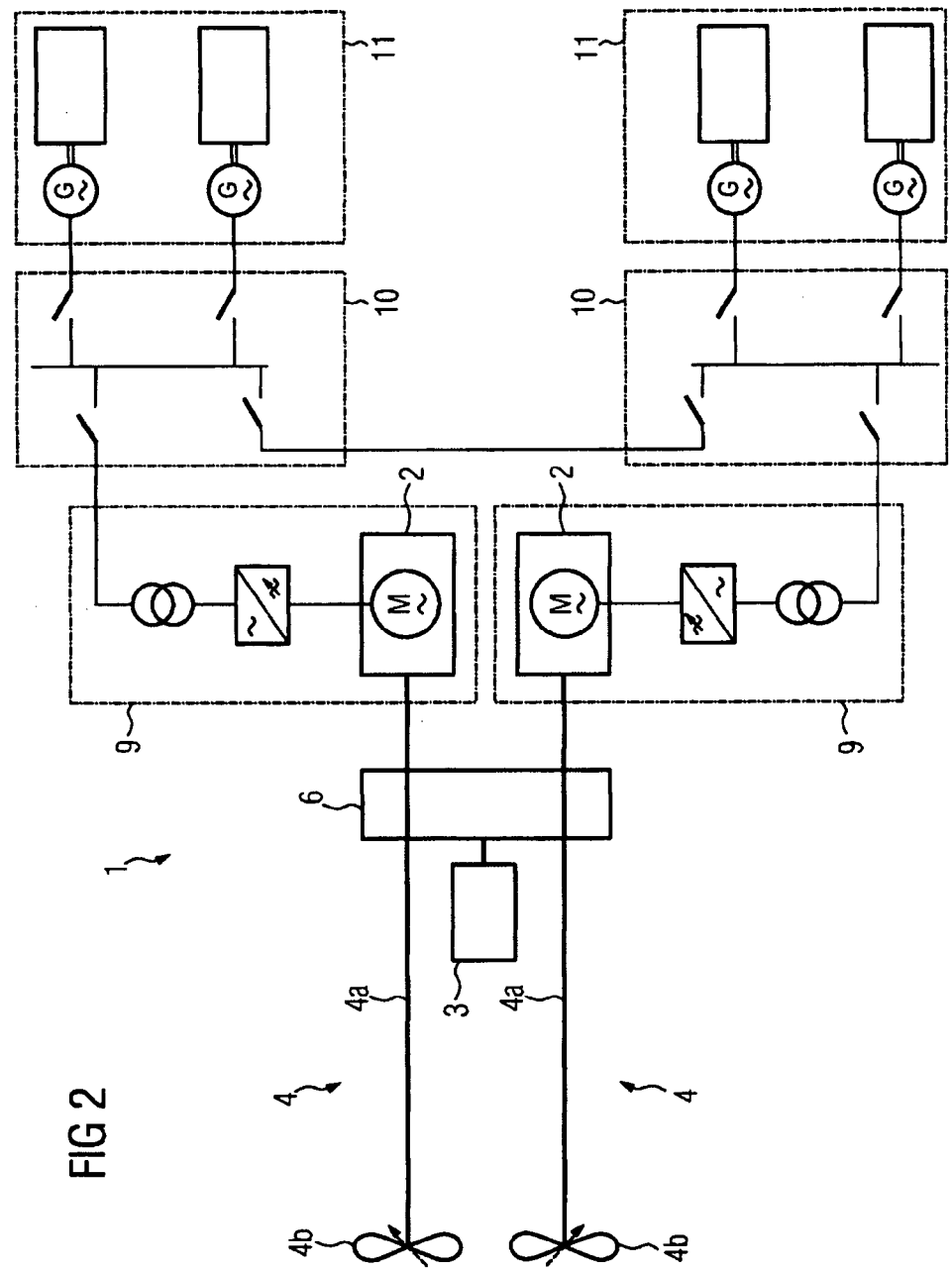
FIG. 2 shows one example of a hybrid propulsion system for a two-shaft marine vessel.

A hybrid propulsion system 1 as shown in FIG. 2 for a two-shaft marine vessel, in contrast to this, have two electrical drive systems 9 each having an electric motor 2, each of which drives in each case one propulsion unit 4 directly, that is to say without an intermediate gearbox. The gas turbine 3 can be coupled to both propeller shafts 4a by means of the gearbox 6. In order to improve the resistance to failure, the two electrical drive systems 9 are each fed from different power distribution installations 10 and power production installations 11.

Both in the case of the hybrid propulsion system shown in FIG. 1 and in the case of the hybrid propulsion system shown in FIG. 2, the drive units 2, 3 drive the propulsion unit or units 4 individually or in conjunction depending on the requirement, for example the marine-vessel speed. The electric motor or motors 2 is or are in this case used as main drive systems for driving the propulsion unit or units 4 for a lower speed range (for example up to and including cruise speed), and the gas turbine 3 is used on its own or with the electric motor or motors 2 as the main drive system for a higher speed range (for example speeds above cruise speed) up to the maximum speed.

In this case, each of the drive units 2, 3 may emit a maximum power which is less than the total power required as a maximum for forward propulsion of the marine vessel.

Figure 3:
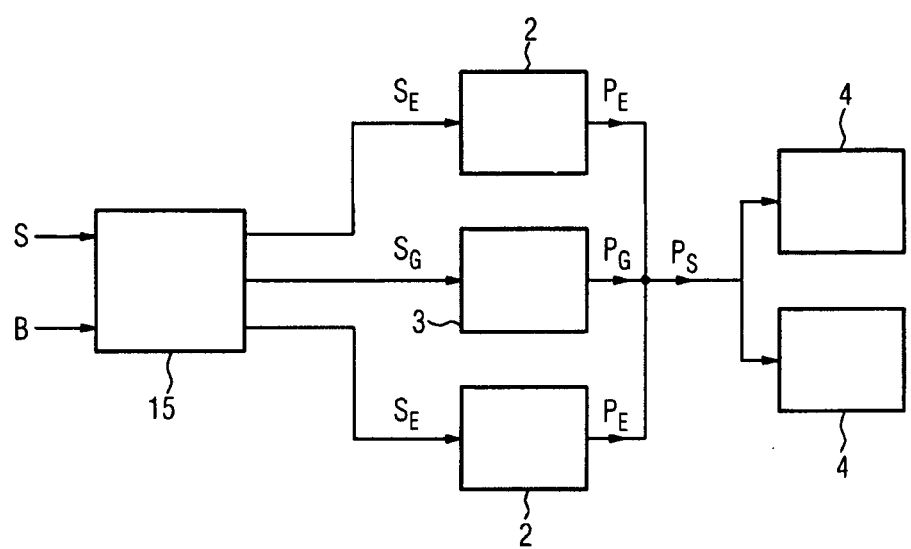
FIG. 3 shows an outline illustration in order to explain the operating method according to an embodiment of the invention.

As is illustrated in simplified form in FIG. 3 for the case of the hybrid propulsion system 1 as shown in FIG. 2, the electric motors 2 and the gas turbine 3 are controlled, with respect to their respective power output $P_E$ and $P_G$ to the propulsion units 4, by a superordinate control device 15 as a function of a predeterminable nominal value S, for example a nominal value for the rotation speed of the propeller 4b or for the marine-vessel speed, and a predeterminable operating mode B, such that a total power $P_S$ which is dependent on the nominal value S is emitted to the propulsion units 4 by the sum of these power outputs and, in this case, this total power output is split between the power outputs $P_E$ and $P_G$ of the electric motors 2 and of the gas turbine 3, that is to say the level of the respective power elements $P_E$ and $P_G$ to be emitted by the three drive units 2, 3 in order to achieve the total power $P_S = P_E + P_G + P_E$, as a function of the nominal value S and the predeterminable operating mode B.

The superordinate control device 15 receives the nominal value S from a nominal value transmitter, for example a speed lever on the bridge or from an autopilot system, and the operating mode B from an operating-mode transmitter, for example an operating-mode selection switch, which is arranged on the bridge.

In order to control the power outputs $P_E$, $P_G$ of the drive units 2, 3 as a function of a predetermined nominal value S and a predetermined operating mode B, the superordinate control device 15 passes nominal values $S_E$, $S_G$ (for example nominal values for the rotation speed or for the torque) to drive system controllers, which are not illustrated in any more detail, for the drive units 2, 3.

The superordinate control device 15 uses the nominal values $S_E$, $S_G$ to control the total power output and the split of the total power to be output between the electric motors 2 and the gas turbine 3, and automatically sets optimum operating points for the predetermined operating mode B.

In this case, the predeterminable operating mode B may be an operating mode in which the exhaust-gas emissions and/or the noise emissions and/or the heat emissions from the hybrid propulsion system 1, preferably including the internal combustion engines 12 for production of the electrical power for the electric motors 2, are a minimum. The predeterminable operating mode B may also be an operating mode in which the total fuel consumption of the hybrid propulsion system 1, preferably including the internal combustion engines 12 for production of the electrical power for the electric motors 2, is a minimum.

In this case, the superordinate control device 15 controls the total power output $P_S$ and/or the split in the total power output $P_S$ between the individual drive units 2, 3 by additionally taking into account limit values for their rate of change, and therefore protects the power components, such as the motors 2 and converters 7, against overloading.

In this case, the open-loop and closed-loop control of the power outputs of the drive units 2, 3 suppresses ripples, caused by torque fluctuations in the propulsion units 4, in actual values which correspond to the nominal value, for example in actual values, detected by rotation-speed sensors, for the rotation speed of the propeller shafts 4a.

In order to control the total power output and the split in the total power output $P_S$ between the individual drive units 2, 3, characteristic lines and/or characteristic data are/is stored in the superordinate control device 15, describing the relationship between the nominal value S, for example the propeller rotation speed or the marine-vessel speed, the respective power output and operating parameters which are characterized by the respective operating mode, for example the fuel consumption, the noise emissions, the exhaust-gas emissions, the heat emissions, heat losses in the rotor systems in the case of machines with superconducting rotor windings, etc. Furthermore, the characteristic lines describe the maximum possible power output.

Figure 4:
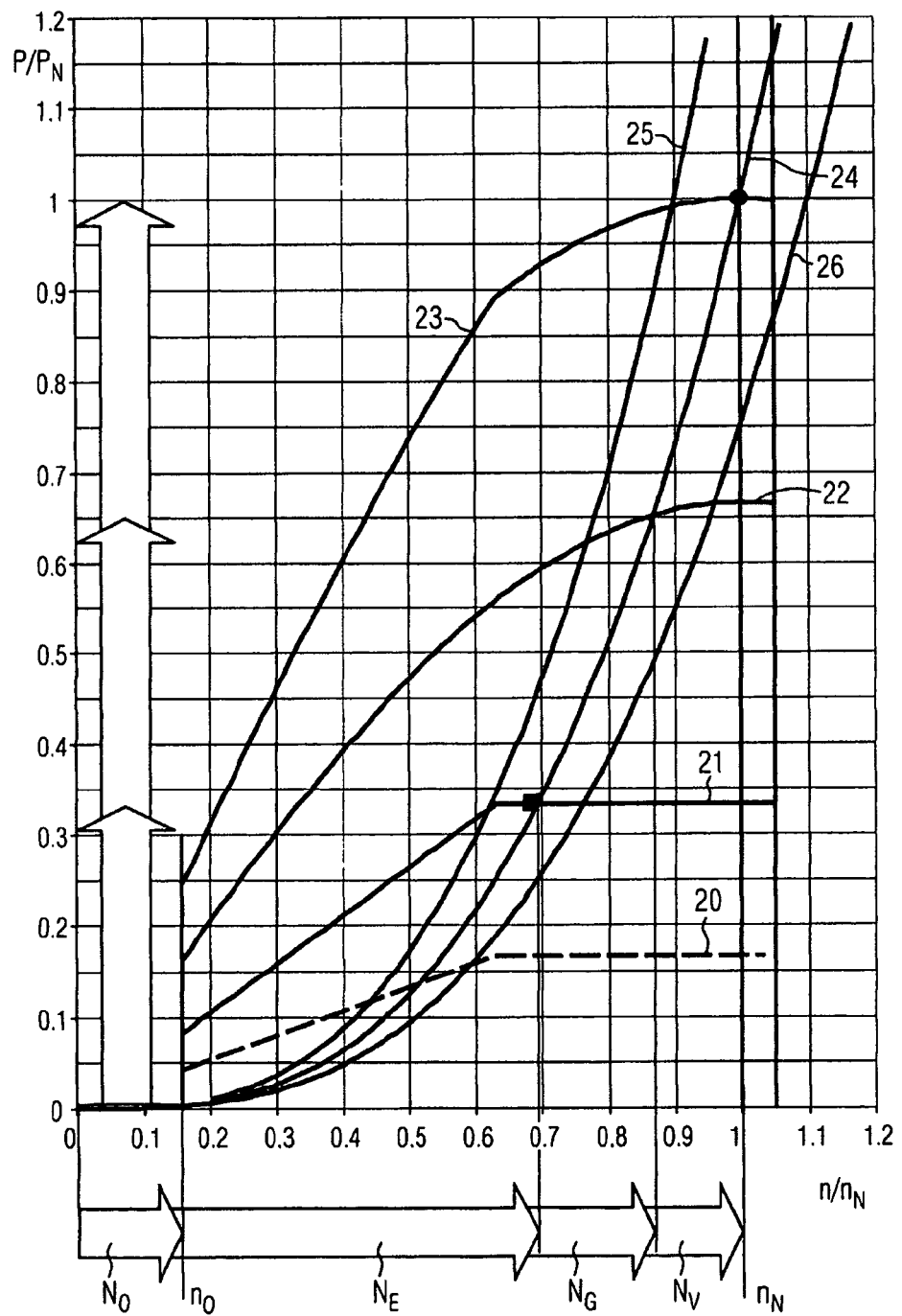
FIG. 4 shows a family of characteristics for controlling the power output of the propulsion sets of a hybrid propulsion system.

By way of example, FIG. 4 shows how the total power output and the split in the total power output between the power outputs $P_E$, $P_G$ of the individual drive units 2, 3 is determined by way of characteristic lines in the superordinate control device 15 for consumption-optimized operation as a function of a nominal value S for the propeller rotation speed n.

This is based on the assumption that the maximum power which can be output by one of the drive units 2, 3 is less than the total power required as a maximum for forward propulsion of the marine vessel, although the sum of the maximum powers which can be output from the individual drive units 2, 3 corresponds to the maximum total power required for full propulsion of the marine vessel.

The characteristic lines 20, 21, 22, 23 (so-called "limit characteristic lines") illustrated in FIG. 4 describe the respective maximum power P which can be output (with respect to the maximum power $P_N$ which can be output in total by the overall hybrid propulsion system) plotted against the propeller rotation speed n (with respect to the maximum rotation speed $n_N$) for each of the drive units 2, 3, and for the drive units 2, 3 being operated together. A first characteristic line 20 indicates the maximum power of a single electric motor 2, a second characteristic line 21 indicates the maximum power of the two electric motors 2 being operated together, a third characteristic line 22 indicates the maximum power of the gas turbine 3, and a fourth characteristic line 24 indicates the maximum power of the two electric motors 2 and the gas turbine 3 being operated together, plotted against the rotation speed n.

The limit characteristic line which is relevant for the respective drive unit is stored in the drive system controllers for the drive units 2, 3, that is to say the limit characteristic line 20 in the drive system controllers for the electric motors 2 and the limit characteristic line 22 in the drive system controllers for the gas turbine 3.

The characteristic lines 21 for two drive units 2 being operated together and the characteristic line 23 for two drive units 2 and a drive unit 3 being operated together are in contrast stored in the superordinate control device 15. The superordinate control device 15 may, however, also access limit characteristic lines stored in the drive system controllers.

The electric motors 2 can output torque continuously variably below their limit characteristic line 20, in a rotation-speed range from zero up to the maximum rotation speed $n_N$ of the propeller shafts 4.

A first propeller characteristic line 24 describes the power consumption behavior for steady-state operating points in normal operating conditions. A second propeller characteristic line 25 in contrast shows the power consumption behavior for steady-state operating points in severe operating conditions, in the event of increased drag on the marine vessel (for example as a result of the sea state or growth) etc. and a third propeller characteristic line 26 describes the power consumption behavior for steady-state operating points in light operating conditions, with reduced marine-vessel drag resulting from smooth water, and in the case of low marine-vessel drag (for example with a new marine vessel), etc.

After the electric motors 2 have been started and the rotation-speed nominal value has been released, the rotation speed of the electric motors 2 is immediately set from zero to a minimum rotation speed $n_0$ (for example 30 rpm), in order to ensure adequate lubrication of the shaft bearings. The rotation-speed range $N_0$ is therefore in principle not an operating range.

If a rotation-speed nominal value from the rotation-speed range $N_E$ is preset for the control device 15 in normal operating conditions (propeller characteristic line 24) and with a "minimum fuel consumption" operating mode selected, then the electric motors 2 have a lower specific consumption than the gas turbine 3. In this rotation-speed range $N_E$ the power split between the drive units 2, 3 is therefore controlled such that only the electric motors 2 output power to the propulsion units 4.

In this case, 50% of the required total power may be provided by each of the two electric motors 2 and may be output to the respective propeller shaft 4a. The two electric motors 2 are then coupled to the propeller shafts 4a. The gas turbine 3 and the gearbox 6 are in contrast decoupled from the propeller shafts 4a. The preset rotation-speed nominal value is passed on from the superordinate control device 15 to the drive system controllers for the electric motors 2. The power of the electric motors 2 is then increased by the drive system controllers thereof along an acceleration curve which is stored in the drive system controllers, until the propeller shafts 4a have reached the preset rotation-speed nominal value. The rotation speed of the propeller shafts 4a is therefore controlled by the electric motors 2.

When the end of the rotation-speed range $N_E$ is reached, because a rotation-speed nominal value S from the rotation-speed range $N_G$ for gas turbine operation has now been preset or because the electric motors 2 do not reach the rotation-speed nominal value (for example because of a heavy sea, see the propeller curve 25), then power must be produced by the gas turbine 3. The gas turbine 3 and the associated auxiliary sets are therefore started. This can be done either automatically by the superordinate control device 15 or only in response to a request from the superordinate control device 15 to the bridge, asking whether gas-turbine operation is desired, and express confirmation by the bridge.

The superordinate control device 15 then passes an appropriate rotation-speed nominal value to the drive system controller for the gas turbine 3, in response to which the rotation speed of the gas turbine 3 is accelerated. As soon as the rotation speed of the gas turbine 3 and of the gearbox 6 is greater than the rotation speed of the propeller shafts 4a, the gearbox 6 is coupled to the propeller shafts 4a, and the superordinate control device 15 switches the rotation-speed nominal-value control from the electric motors 2 to the gas turbine 3. In this case, the rotation-speed nominal value is in the rotation-speed range $N_G$.

The power control for the drive system controller for the gas turbine 3 now comes into action, and the gas turbine 3 outputs its power to the propeller shafts 4a, while at the same time the electric motors 2 are switched over from rotation-speed control to torque control. Because of the position of the rotation-speed nominal value in the rotation-speed range $N_G$, the torque nominal value or current nominal value for the electric motors 2 is in this case set to zero, and their power is therefore reduced. When the current nominal value of the electric motors 2 has reached zero, the electric motors 2 are decoupled from the propeller shafts 4a after a preselected time. The rotation speed of the propeller shafts 4a is now controlled by the drive system controller for the gas turbine 3, along an acceleration curve, at the desired nominal value. The rotation speed of the propeller shafts 4a is therefore controlled by the gas turbine 3.

Figure 5:
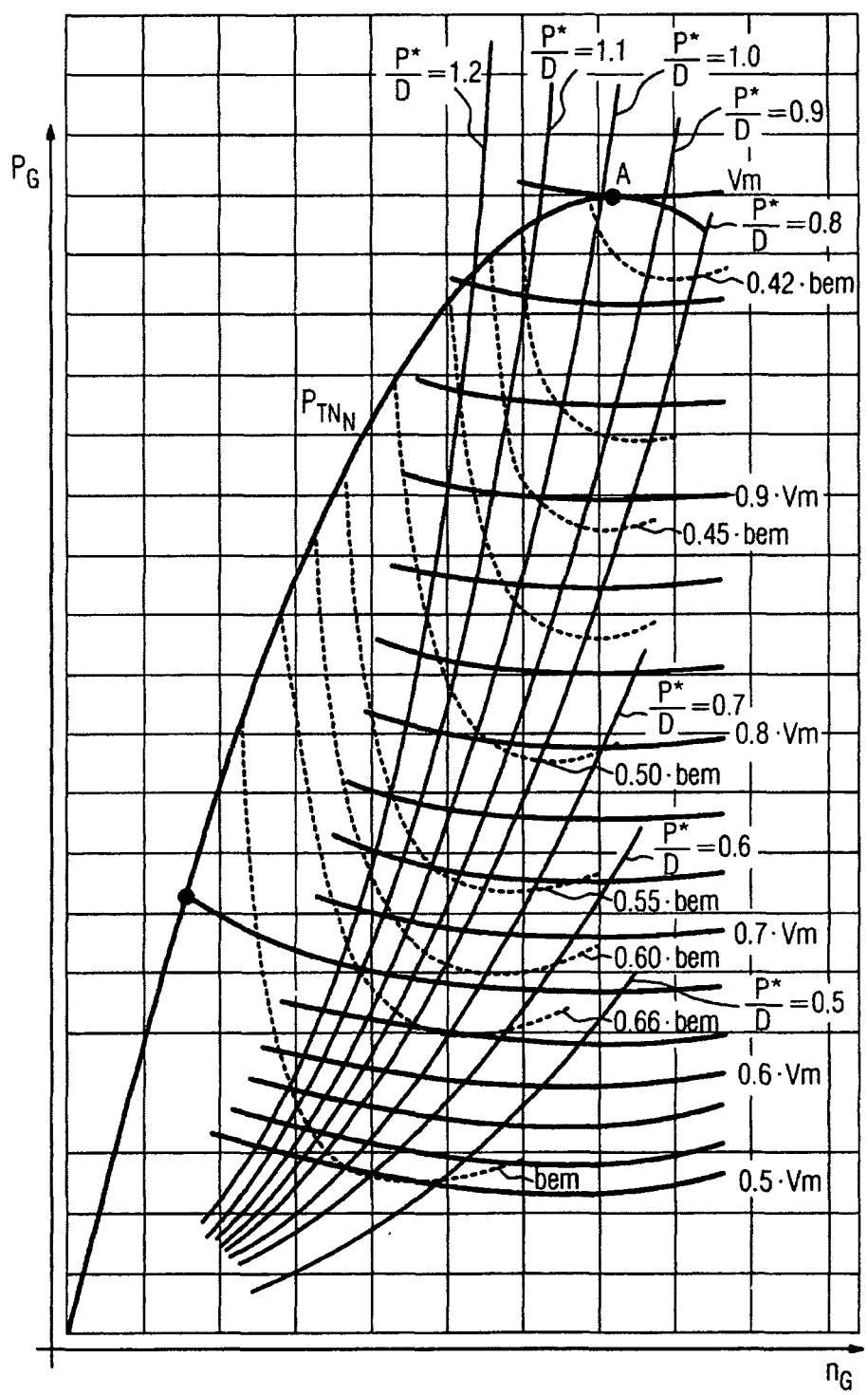
FIG. 5 shows a family of characteristics for a gas turbine with a variable-pitch propeller installation.

In this case the gas turbine 3 is always as far as possible operated with the best efficiency and therefore at the optimum specific consumption, for example on the basis of a family of characteristic lines as shown in FIG. 5 and with which a person skilled in the art will be familiar, in conjunction with the variable-pitch propellers 4b. In this case, $n_G$ denotes the rotation speed of the gas turbine, $P_G$ the power of the gas turbine, $P^*/D$ the pitch ratio of the variable-pitch propeller, vm the maximum marine-vessel speed, $b_{em}$ the maximum specific fuel consumption in kg/(kW*h) and $P_{TNN}$ the rated power or useful power of the gas turbine.

If the end of the rotation-speed range $N_G$ is reached, because a rotation-speed nominal value is now preset from the rotation-speed range $N_V$ for joint operation or because the gas turbine 3 (for example because of a heavy sea, see the propeller curve 25) does not reach the preset rotation-speed nominal value, then power must additionally be output from the electric motors 2 to the propulsion units 4, and the electric motors 2 are started. This can be done either automatically by the superordinate control device 15 or only in response to a request from the superordinate control device 15 to the bridge, asking whether joints operation is desired, and express confirmation by the bridge.

For this purpose, the electric motors 2 are brought into the region of the propeller shaft rotation speed, and are then coupled to the respective propeller shaft 4a. Torque regulation of the electric motors 2 is then enabled, corresponding to the rotation-speed nominal value S, and the current of the electric motors 2 is increased until the rotation speed reaches the rotation-speed nominal value S.

When the electric motors 2 are being operated together with the gas turbine 3, the gas turbine 3 therefore controls the rotation speed of the propulsion unit 4. The rotation speeds of the electric motors are controlled by the propulsion units 4 and by the gas turbine 3 and, governed by the nominal value preset, output a torque to the propulsion units 4 such that the powers in each case output from the gas turbine 3 and from the electric motor 2 are added in the propulsion units 4.

The power split between the gas turbine 3 and the electric motors 2 is in this case controlled by the superordinate control device 15 as a function of the nominal value S and the predetermined operating mode B.

In the consumption-optimized operating mode, the gas turbine 3 is controlled in the rotation-speed range $N_V$ for joint operation, for example always at the optimum of its specific consumption. The electric motors 2 produce only the difference power which is required to reach the rotation-speed nominal value S.

In the acceleration-optimized operating mode, the control device 15 additionally controls the power split as a function of the rate of change of the nominal value. For example, at a very low rotation speed in the rotation-speed range $N_E$ for electric-motor operation, if a rotation-speed nominal value from the rotation-speed range $N_V$ is preset, the gas turbine 3 is already connected to the propeller shafts 4a in the rotation-speed range $N_E$.

Figure 6:
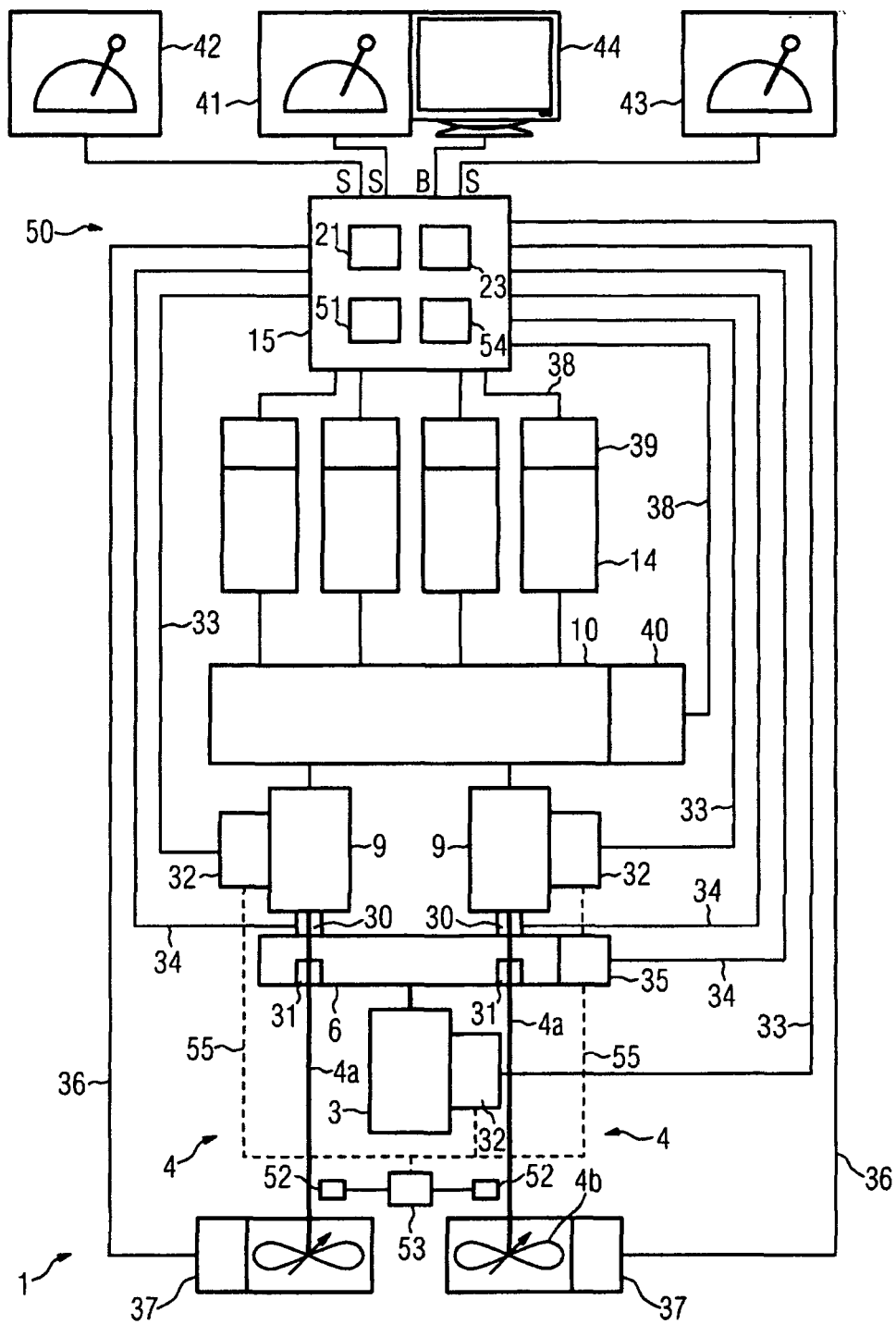
FIG. 6 shows a hybrid propulsion system with an apparatus according to an embodiment of the invention.

FIG. 6 shows a hybrid propulsion system 1 for a two-shaft marine vessel having an apparatus 50 which is particularly suitable for carrying out the method as explained above. The hybrid propulsion system 1 has two electrical drive systems 9 and a gas turbine 3 as drive units for driving two propulsion units 4 each comprising a propeller shaft 4a and a variable-pitch propeller 4b. The propulsion units 4 can in this case be driven individually and jointly by the drive units 2, 3. The propeller shafts 4a can for this purpose be connected at the end remote from the propeller 5 to a respective electrical drive system 9 by means of a clutch 30, without any intermediate gearbox. The gas turbine 3 can be coupled to the propeller shafts 4a by means of a gearbox 6 and quick-action couplings 31. Power can also be transmitted via the gearbox 6 from only one electrical drive system 9 to both propeller shafts 4a. Each of the electrical drive systems 9 comprises an electric motor, a converter and a converter transformer (see FIGS. 1 and 2), and is supplied with electrical power via a power distribution installation 10, with this power being produced by diesel generator sets 14.

The apparatus 50 has a machine telegraph or speed lever installed in the bridge control station, or an autopilot system, as the nominal value transmitter for a nominal value S for the rotation speed for the propulsion units 4. Alternatively, the nominal value can also be preset by machine telegraphs or a speed lever 42 in other control stations, for example in the machine control station, or by an emergency telegraph 43.

The apparatus 50 also has an operating mode selection switch 44 which is installed in the bridge control station, for the marine-vessel crew to preset a desired operating mode B. The operating-mode selection switch 44 is in this case in the form of a selection panel on a control interface indicated on a monitor.

Furthermore, the apparatus 50 has a control device 15 which is designed to control the respective power output of the drive units 2, 3 to the propulsion units 4 such that a total power which is dependent on the nominal value S can be output to the propulsion units 4 as a result of the sum of these power outputs, wherein the split in this total power output between the power outputs of the individual drive units 2, 3 is a function of the nominal value S and the preset operating mode B. For this purpose, the characteristic lines 21, 23 for joint operation of the drive units 2, 3 are stored in the control device 15.

The apparatus 50 furthermore has drive system controllers 32, which are associated with the individual drive units 2, 3, for open-loop and closed-loop control of their respective power output, wherein the control device 15 controls the power output of the drive units 2, 3 by presetting rotation-speed nominal values or torque nominal values for the drive system controllers 32. These nominal values are supplied to the drive system controllers 32 from the control device 15 via control lines 33.

The superordinate control device 15 is also connected via control lines 34 to a gearbox control system 35 and to control devices, which are not shown in any more detail, for the couplings 30, 31. This allows the superordinate control device 15 to control the gearbox settings (including the associated auxiliary sets) as well as the coupling positions, and therefore to connect and disconnect the individual drive units 2, 3 specifically to the propeller shafts 4a.

In order to control the pitch angle on the variable-pitch propellers 4b, the superordinate control device 15 is connected via control lines 36 to control systems 37 for the variable-pitch propellers 4b.

In order to control the electrical power production and distribution, the superordinate control device 15 is also connected via control lines 38 to control systems 39, 40 for the power generator sets 14 and the power distribution installation 10.

The control device 15 comprises at least one limiting device 51 for limiting the rates of change of the total power output and/or the split of the total power output between the individual drive units. The limiting device 51 may in this case be in the form of hardware and/or software.

In order to allow the drive system controllers 32 to control the power outputs of the drive units 2, 3, the apparatus 50 also has sensors 52 for detection of actual values for the rotation speed of the propeller shafts 4a, as well as filter means 53 for suppression of ripples, in the actual values, caused by torque fluctuations in the propulsion units 4. The filter means 53 may in this case be in the form of hardware and/or software.

In order to control the total power output to the individual drive units 2, 3 as a function of the rate of change of the nominal value S, for example in the event of a rapid change in the nominal value from the rotation-speed range $N_E$ for electric-motor operation to the rotation-speed range $N_V$ for joint operation, the control device 15 has acceleration control means 54, which may be in the form of software and/or hardware.

In this case, the lines 33, 34, 36, 38 and/or 55 need not be in the form of discrete lines, but may also be in the form of a communication bus.

The superordinate control device 15 is preferably in a redundant form, in particular with at least one such control device 15 on the bridge and one at an emergency control station, for example in the stern of the marine vessel, since the control device 15 represents the essential part of the drive system controller for the marine vessel, and must therefore always be available.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operation of a hybrid propulsion system of a marine vessel including at least one electric motor and at least one internal combustion engine as drive units, which individually or jointly drive at least one propulsion unit, the method comprising:
controlling as a function of a nominal value and a first determinable operating mode of a plurality of operating modes, via a control device, respective power outputs of the drive units to the at least one propulsion unit, such that a total power output, which is dependent on the nominal value, is emitted to the at least one propulsion unit as a result of the sum of the respective power outputs, wherein
the total power output is split between the drive units as a function of the nominal value and of the first operating mode,
the total power output and the splitting of the total power output between the drive units are controlled on the basis of at least one of characteristic data and characteristic lines of an assembly of the drive units,
the control device is configured to store the at least one of characteristic data and characteristic lines for each of the plurality of operating modes,
the control device selects the at least one of characteristic data and characteristic lines relevant for control of the power split for the first operating mode as a function of the first operating mode, and
at least one of the total power output and the split in the total power output between the drive units is controlled taking account of limit values for the drive units' rate of change.

2. The method as claimed in claim 1, wherein, during operation of the hybrid propulsion system, the at least one propulsion unit is at least one of mechanically firmly coupled and configured to mechanically firmly couple to the at least one electric motor and the at least one internal combustion engine.

3. The method as claimed in claim 2, wherein, during operation of the hybrid propulsion system, the at least one internal combustion engine is mechanically coupled to the at least one propulsion unit to be driven and is decoupled therefrom as a function of the total power output requirement.

4. The method as claimed in claim 1, wherein, during operation of the hybrid propulsion system, the at least one internal combustion engine is mechanically coupled to the at least one propulsion unit to be driven and is decoupled therefrom as a function of the total power output requirement.

5. The method as claimed in claim 1, wherein a connection or disconnection of the drive units to and from the at least one propulsion unit is controlled via the control of the power split.

6. The method as claimed in claim 1, wherein the first determinable operating mode is an operating mode in which at least one of exhaust-gas emissions, noise emissions and the heat emissions from the hybrid propulsion system are a minimum.

7. The method as claimed in claim 1, wherein the first determinable operating mode is an operating mode in which the total fuel consumption of the hybrid propulsion system is a minimum.

8. The method as claimed in claim 1, wherein the nominal value is determined by one of a manually controllable speed lever and an autopilot system.

9. The method as claimed in claim 1, further comprising:
at least one of connecting and disconnecting a power output from at least one of the drive units to and from a propulsion unit without any torque surges.

10. The method as claimed in claim 1, wherein each of the drive units is configured to emit a maximum power which is less than the total power required as a maximum for full propulsion of the marine vessel.

11. The method as claimed in claim 1, wherein the at least one electric motor is configured to emit torque continuously variably at a rotation speed range from zero up to the maximum rotation speed of the at least one propulsion unit, below the at least one electric motor's limit characteristic line.

12. The method as claimed in claim 1, wherein ripples in actual values, which correspond to the nominal value are suppressed in the control of the respective power outputs of the drive units.

13. The method as claimed in claim 1, wherein the at least one electric motor is used as a main drive system for propulsion of the marine vessel for a lower speed range of the marine vessel, and the at least one internal combustion engine is used, on its own or in conjunction with the at least one electric motor, as the main drive system for a higher speed range of the marine vessel up to the maximum speed.

14. The method as claimed in claim 13, wherein, in the lower speed range, the at least one electric motor carries out a rotation speed control of the at least one propulsion unit and, in the higher speed range, the at least one internal combustion engine carries out the rotation speed control of the at least one propulsion unit, wherein, when the at least one electric motor is being operated together with the at least one internal combustion engine, the internal combustion engine carries out the rotation speed control of the at least one propulsion unit, and the rotation speed of the electric motor is controlled by the at least one propulsion unit or by the internal combustion engine and, governed by the nominal value, emits a torque to the at least one propulsion unit such that the torques which are respectively emitted by the internal combustion engine and the electric motor are added in the at least one propulsion unit.

15. The method as claimed in claim 1, wherein a hybrid propulsion system is used which has only two electric motors and only one gas turbine as the drive units, and only two propeller shafts each having one propeller as the at least one propulsion unit, wherein the propeller shafts are passed through a gearbox via which the propeller shafts are coupleable to the gas turbine, and wherein each of the propeller shafts are coupleable to one of the electric motors at an end of the propeller shaft remote from the propeller, without an intermediate gearbox.

16. The method as claimed in claim 1, wherein the rates of change are based on time constants of the at least one propulsion unit with respect to at least one of thrust from the at least one propulsion unit and the power output in the at least one electric motor.

17. A method for operation of a hybrid propulsion system of a marine vessel including at least one electric motor and at least one internal combustion engine as drive units, which individually or jointly drive at least one propulsion unit, the method comprising:
controlling as a function of a nominal value and a first determinable operating mode of a plurality of operating modes, via a control device, respective power outputs of the drive units to the at least one propulsion unit, such that a total power output, which is dependent on the nominal value, is emitted to the at least one propulsion unit as a result of the sum of the respective power outputs, wherein
the total power output is split between the drive units as a function of the nominal value and of the first operating mode,
the total power output and the splitting of the total power output between the drive units are controlled on the basis of at least one of characteristic data and characteristic lines of an assembly of the drive units,
the control device is configured to store the at least one of characteristic data and characteristic lines for each of the plurality of operating modes,
the control device selects the at least one of characteristic data and characteristic lines relevant for control of the power split for the first operating mode as a function of the first operating mode, and
the split of the total power output is additionally controlled as a function of rate of change of the nominal value.

18. An apparatus for a hybrid propulsion system in a marine vessel including at least one electric motor and at least one internal combustion engine as drive units which individually or jointly drive at least one propulsion unit, the apparatus comprising:
a nominal value transmitter for presetting a nominal value;
an operating mode transmitter for presetting a first operating mode of a plurality of operating modes; and
a control device, designed to control a power output for each of the drive units to the at least one propulsion unit such that a total power output, which is dependent on the nominal value, is emittable to the at least one propulsion unit as a result of the sum of the power outputs for each of the drive units, and the total power output is split between the drive units as a function of the nominal value and of the first operating mode, wherein
the total power output and the splitting of the total power output between the drive units are controlled on the basis of at least one of characteristic data and characteristic lines of an assembly of the drive units,
the control device is configured to store the at least one of characteristic data and characteristic lines for each of the plurality of operating modes,
the control device selects the at least one of characteristic data and characteristic lines relevant for control of the power split for the first operating mode as a function of the first operating mode, and
the control device includes at least one limiting device for limiting the rates of change of at least one of the total power output and the split in the total power output between individual ones of the drive units.

19. The apparatus as claimed in claim 18, wherein, during operation of the hybrid propulsion system, the at least one propulsion unit is at least one of mechanically firmly coupled and configured to mechanically firmly couple to at least two drive units.

20. The apparatus as claimed in claim 19, wherein the at least one internal combustion engine is at least one of mechanically coupleable to the at least one propulsion unit to be driven and decoupleable therefrom as a function of the total power output requirement during operation of the hybrid propulsion system.

21. The apparatus as claimed in claim 18, wherein the at least one internal combustion engine is at least one of mechanically coupleable to the at least one propulsion unit to be driven and decoupleable therefrom as a function of the total power output requirement during operation of the hybrid propulsion system.

22. The method as claimed in claim 18, wherein the control device is designed to also control the connection or disconnection of the drive units to and from the at least one propulsion unit via the control of the power split.

23. The apparatus as claimed in claim 18, wherein the nominal value transmitter is a manually operable speed lever or an autopilot system.

24. The apparatus as claimed in claim 18, further comprising:
   drive system controllers, which are associated with the individual drive units, for controlling the drive units' respective power output, and wherein the control device controls the power output of the drive units by presetting rotation speed nominal values or torque nominal values for the drive system controllers.

25. The apparatus as claimed in claim 18, wherein at least one of characteristic data and characteristic lines of the drive units are stored in the control device, in order to control at least one of the total power output and the split in the total power output between the power outputs of individual ones of the drive units.

26. The apparatus as claimed in claim 18, wherein, in order to control the power output of the drive units, the apparatus includes sensors for detection of at least one actual value, which corresponds to the at least one nominal value, and at least one filter device for suppression of ripples in the actual values caused by torque fluctuations of the at least one propulsion units.

27. The apparatus as claimed in claim 18, wherein the control device is provided in a redundant form.

28. The apparatus as claimed in claim 27, wherein the control device is provided at least once on the bridge and once at an emergency control station.

29. The apparatus as claimed in claim 18, wherein the rates of change are based on time constants of the at least one propulsion unit with respect to at least one of thrust from the at least one propulsion unit and the power output in the at least one electric motor.

30. An apparatus for a hybrid propulsion system in a marine vessel including at least one electric motor and at least one internal combustion engine as drive units which individually or jointly drive at least one propulsion unit, the apparatus comprising:
   a nominal value transmitter for presetting a nominal value;
   an operating mode transmitter for presetting a first operating mode of a plurality of operating modes; and
   a control device, designed to control a power output for each of the drive units to the at least one propulsion unit such that a total power output, which is dependent on the nominal value, is emittable to the at least one propulsion unit as a result of the sum of the power outputs for each of the drive units, and the total power output is split between the drive units as a function of the nominal value and of the first operating mode, wherein
   the total power output and the splitting of the total power output between the drive units are controlled on the basis of at least one of characteristic data and characteristic lines of an assembly of the drive units,
   the control device is configured to store the at least one of characteristic data and characteristic lines for each of the plurality of operating modes,
   the control device selects the at least one of characteristic data and characteristic lines relevant for control of the power split for the first operating mode as a function of the first operating mode, and
   the control device additionally controls the split in the total power output between individual ones of the drive units as a function of the rate of change of the nominal value.

* * * * *